(12) United States Patent
Pillay et al.

(10) Patent No.: US 7,450,184 B1
(45) Date of Patent: *Nov. 11, 2008

(54) CIRCUITS AND METHODS FOR DETECTING 2:2 ENCODED VIDEO AND SYSTEMS UTILIZING THE SAME

(75) Inventors: Sanjay R. Pillay, Austin, TX (US); Brian F. Bounds, Dripping Springs, TX (US); William Lynn Gallagher, Austin, TX (US)

(73) Assignee: Magnum Semiconductor, Inc., Fremont, CA (US)

( * ) Notice: Subject to any disclaimer, the term of this patent is extended or adjusted under 35 U.S.C. 154(b) by 520 days.

This patent is subject to a terminal disclaimer.

(21) Appl. No.: 11/167,756

(22) Filed: Jun. 27, 2005

(51) Int. Cl.
*H04N 9/64* (2006.01)
(52) U.S. Cl. .................. 348/700; 348/441; 348/448; 348/452
(58) Field of Classification Search .......... 348/700, 348/441, 448, 451–452, 458–459; *H04N 9/64*
See application file for complete search history.

(56) References Cited

U.S. PATENT DOCUMENTS

| | | | |
|---|---|---|---|
| 5,339,109 A | 8/1994 | Hong | |
| 5,467,439 A | 11/1995 | Lee et al. | |
| 5,519,451 A | 5/1996 | Clatanoff et al. | |
| 5,532,751 A | 7/1996 | Lui | |
| 5,602,654 A | 2/1997 | Patti et al. | |
| 5,708,474 A | 1/1998 | Hong | |
| 5,832,143 A | 11/1998 | Suga | |
| 6,133,957 A | 10/2000 | Campbell | |
| 6,295,091 B1 | 9/2001 | Huang | |
| 6,400,762 B2 | 6/2002 | Takeshima | |
| 6,459,455 B1 * | 10/2002 | Jiang et al. | 348/452 |
| 6,577,435 B1 | 6/2003 | Bang et al. | |
| 6,614,484 B1 | 9/2003 | Lim et al. | |
| 6,757,022 B2 | 6/2004 | Wredenhagen | |
| 6,795,123 B2 | 9/2004 | Gotanda et al. | |
| 7,206,028 B2 * | 4/2007 | Yeh et al. | 348/448 |
| 7,286,185 B2 * | 10/2007 | Wong et al. | 348/452 |
| 2005/0168655 A1 * | 8/2005 | Wyman et al. | 348/700 |

* cited by examiner

*Primary Examiner*—Trang U Tran
(74) *Attorney, Agent, or Firm*—James J. Murphy; Thompson & Knight LLP

(57) ABSTRACT

A method of detecting a stream of video data generated utilizing a pull-down technique includes receiving a sequence of fields of interlaced video data. For each pair of a plurality of pairs of the fields of interlaced video in the sequence, pixel values corresponding to pixel positions of pixel lines of a first parity of a first field of the pair of fields are weaved with pixel values corresponding to pixel positions of pixel lines of a second parity of a second field of the pair of fields. For each pixel value corresponding to each pixel position of each pixel line of the second field of the pair of fields after weaving, a check is made for feathering at the corresponding pixel position due to motion. The pixel positions with feathering due to motion in the second field of the pair of fields are counted, and, for the plurality of pairs of fields in the sequence, a check is made for a pattern in the number of counted pixel positions with feathering due to motion in the second field of each pair of fields to determine if the video data comprises data generated utilizing a pull-down technique.

22 Claims, 9 Drawing Sheets

Interlaced

Progressive Scan

CIRCUITS AND METHODS FOR DETECTING 2:2 ENCODED VIDEO AND SYSTEMS UTILIZING THE SAME

CROSS REFERENCE TO RELATED APPLICATION

The following co-pending and co-assigned applications contain related information and are hereby incorporated by reference:

Ser. No. 11/167,877 by Pillay, Bounds and Gallagher entitled CIRCUITS AND METHODS FOR DEINTERLACING VIDEO DISPLAY DATA AND SYSTEMS USING THE SAME, filed Jun. 27, 2005; and Ser. No. 11/167,682 by Pillay, Bounds and Gallagher entitled SYSTEMS AND METHODS FOR DETECTING A CHANGE IN A SEQUENCE OF INTERLACED DATA FIELDS GENERATED FROM A PROGRESSIVE SCAN SOURCE, filed Jun. 27, 2005.

FIELD OF INVENTION

The present invention relates in general to video processing techniques, and in particular, to circuitry and methods for detecting 2:2 encoded video and systems utilizing the same.

BACKGROUND OF INVENTION

Two primary video format standards are utilized worldwide to record, transmit, and display composite video data, namely, the National Television Systems Committee (NTSC) and the Phase Alternating Line (PAL) standards. Both the NTSC and PAL standards define interlaced video systems in which one frame of display pixels is partitioned into alternating interlaced fields, with each interlaced field updated at twice the update rate of the frame. Additionally, many digital versatile disk (DVD) players, DVD player-recorders, and similar video recording and playback systems, output data in an interlaced format, depending on the format used to broadcast or record the given playback media.

On the other hand, many state of the art display systems, such as high definition television (HDTV) sets, generate displays using a progressive scan format. In the progressive scan format, video data are transmitted and displayed in frames, which are not partitioned into fields. In other words, each display frame is generated by sequentially scanning through all the lines of each frame at the original field update rate. Hence, in order to interface an interlaced video source, such as television cable interface or a DVD player playing-back an interlaced format DVD, with a progressive-scan display system, such as a HDTV set, deinterlacing must be performed.

Furthermore, films are typically produced with a frame rate of twenty four (24) frames per second, while in the PAL video system, frames are generated at a rate of twenty five (25) frames per second from interlaced fields at a rate of fifty (50) fields per second. During conversion of film to interlaced PAL video, the 2:2 pull-down technique is typically utilized to convert the film frames into interlaced fields, which are then used to reconstruct frames on the PAL display, in either an interlaced or progressive scan format. In particular, the frame rate of twenty four (24) frames per second is increased by four percent (4%) to generate frames at a rate of twenty five (25) frames per second. The 2:2 pull-down technique then converts the twenty five (25) frames per second data into fifty (50) fields per second data. Additional applications of the 2:2 pull-down technique include the conversion of computer generated images into interlaced video, and the conversion of thirty (30) frames per second film into sixty (60) fields per second interlaced video. For discussion purposes, a PAL system will be used as an example.

The 2:2 pull-down technique replicates the content of each film frame twice to generate identical odd and even interlaced video fields. In an interlaced playback system, these interlaced fields are each displayed at the PAL field rate of fifty (50) fields per second to generate full video frames at the PAL frame rate of twenty five (25) frames per second. The PAL frame rate is therefore slightly higher than the original film rate of twenty four (24) frames per second. For progressive scan systems, corresponding pairs of odd and even fields are weaved together to generate frames at the PAL interlaced frame rate of twenty-five (25) frames per second, and then each frame is repeated twice to generate a stream of frames at the progressive scan frame rate of fifty (50) frames per second.

In order to correctly generate either interlaced or progressive scan frames from interlaced PAL fields that were originally derived from film, the correct pairs of odd and even fields must be weaved together. Hence, some form of 2:2 mode detection must be performed to detect when a sequence of fields was originally generated from film with the 2:2 pull-down technique and subsequently identify the correct pair of fields that will be weaved together to compose each display frame.

Given increasing popularity of progressive scan display systems, as well as the need to maintain compatibility with systems generating interlaced display data, new 2:2 detection techniques are required. In particular, these deinterlacing techniques should allow for the generating of progressive scan displays from interlaced data created by 2:2 pull-down.

SUMMARY OF INVENTION

The principles of the present invention are embodied in systems and methods for detecting video data generated using pull-down techniques. In one particular embodiment, a method is disclosed for detecting a stream of video data generated utilizing a pull-down technique includes receiving a sequence of fields of interlaced video data. For each pair of a plurality of pairs of the fields of interlaced video in the sequence, pixel values corresponding to pixel positions of pixel lines of a first parity of a first field of the pair of fields are weaved with pixel values corresponding to pixel positions of pixel lines of a second parity of a second field of the pair of fields. For each pixel value corresponding to each pixel position of each pixel line of the second field of the pair of fields after weaving, a check is made for feathering at the corresponding pixel position due to motion. The pixel positions with feathering due to motion in the second field of the pair of fields are counted, and, for the plurality of pairs of fields in the sequence, a check is made for a pattern in the number of counted pixel positions with feathering due to motion in the second field of each pair of fields to determine if the video data comprises data generated utilizing a pull-down technique.

Embodiments of the present principles are particularly advantageous when applied to systems and methods for detecting a stream of video data which has been generated by a 2:2 pull-down process. Additionally, when a stream video data fields generated by 2:2 pull-down is detected, these principles allow for pairs fields to be properly selected for generating progressive scan video frames by deinterlacing. Furthermore, vertical spatial high frequency data are preserved during deinterlacing of 2:2 pull-down generated fields.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
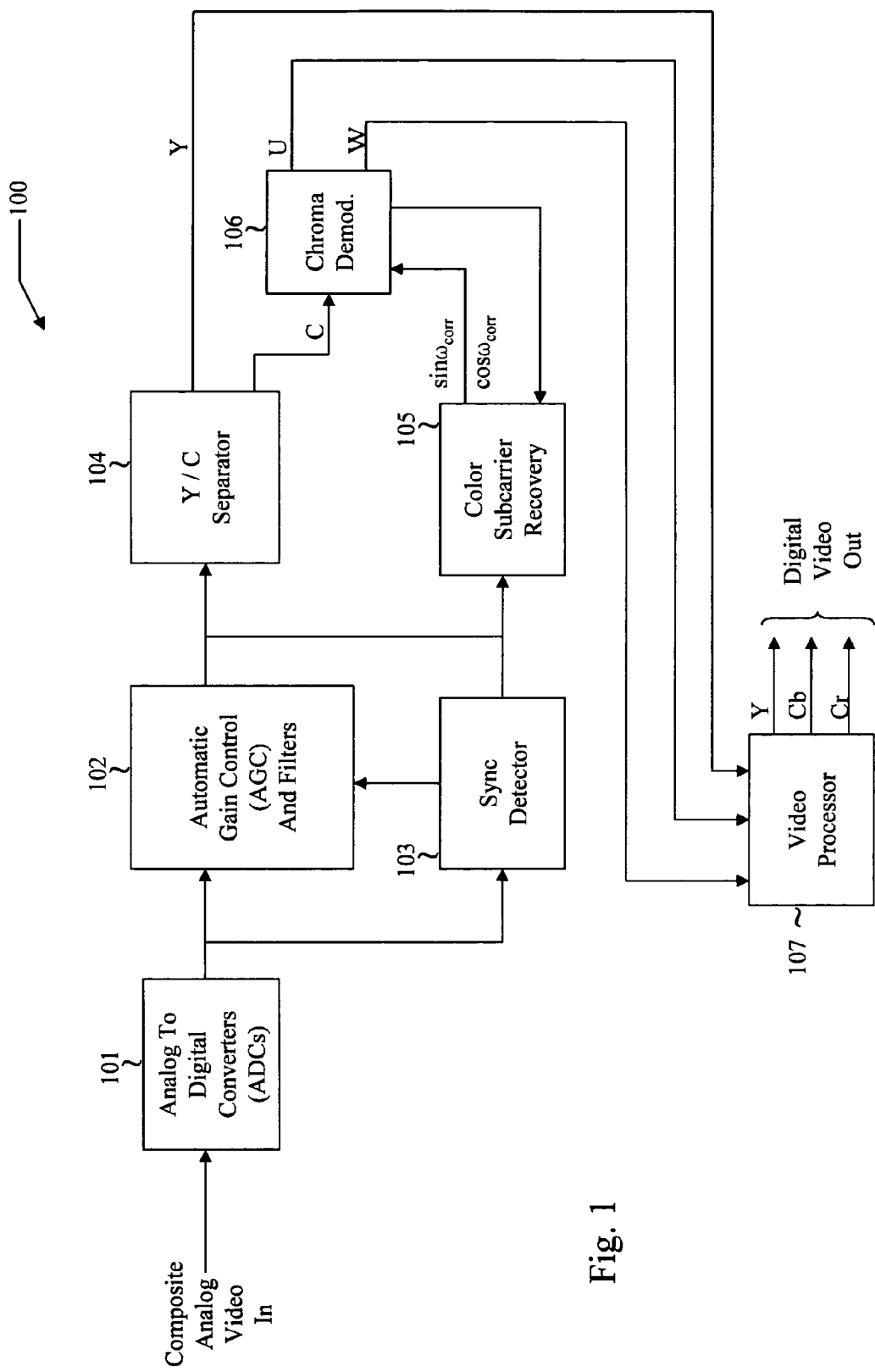
FIG. 1 is a high level block diagram of a representative audio-video system suitable for demonstrating the principles of the present invention.
Figure 2:
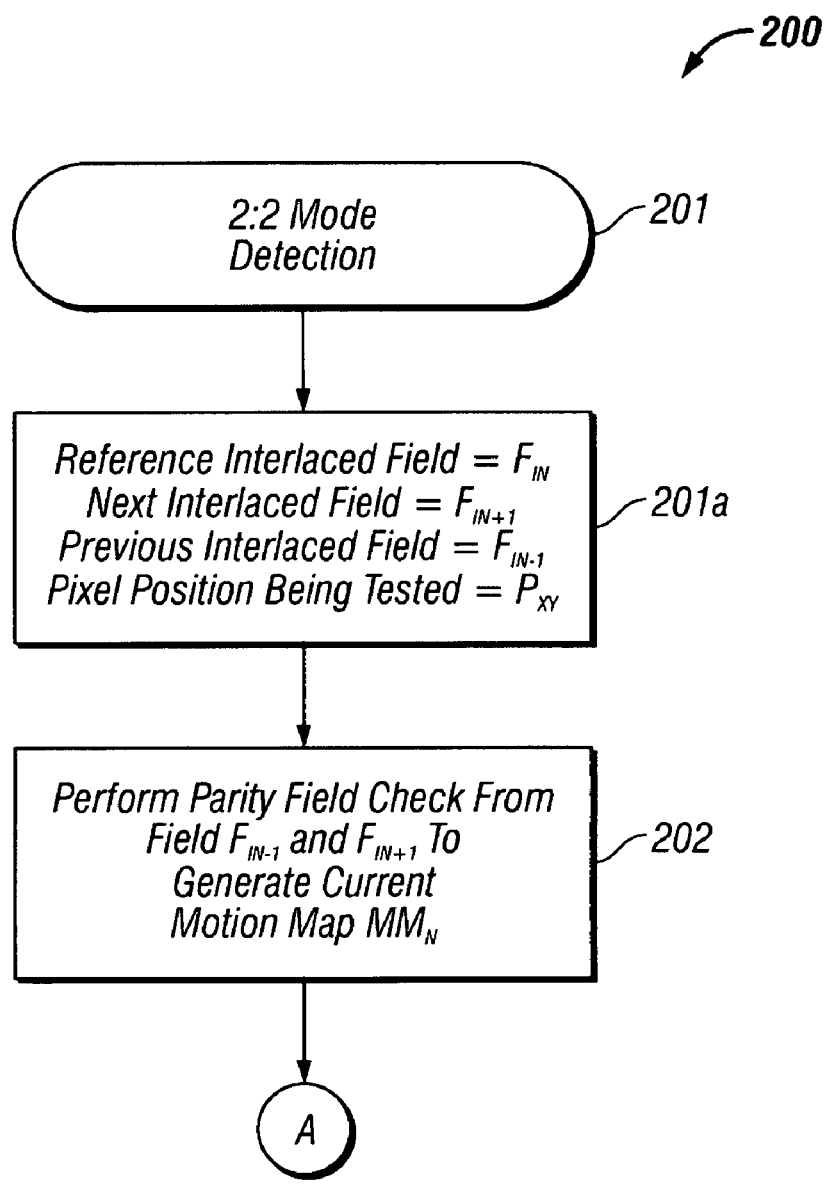
FIG. 2 is a flow chart of an exemplary 2:2 detection procedure embodying the principles of the present invention.
Figure 2:
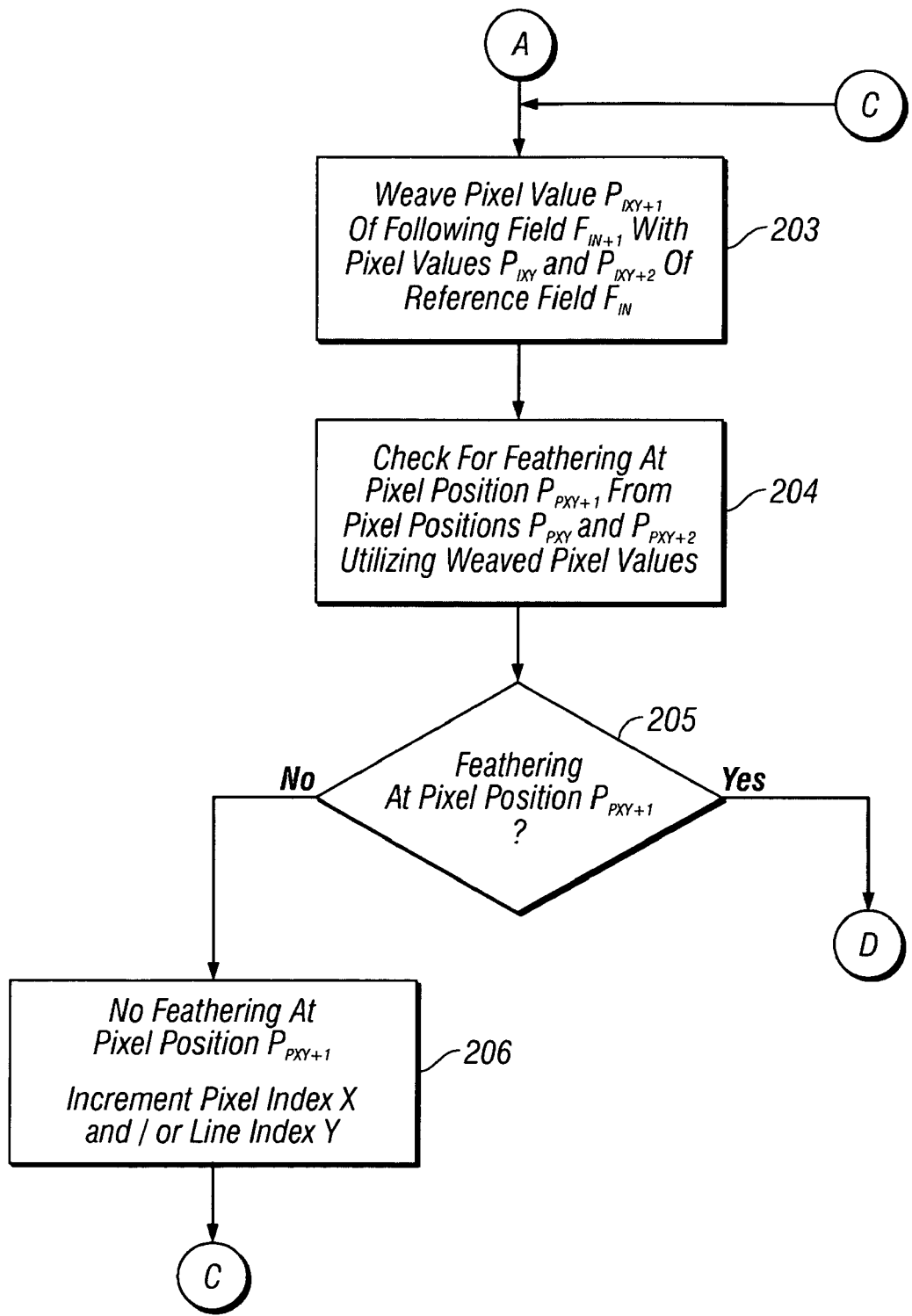
Figure 2:
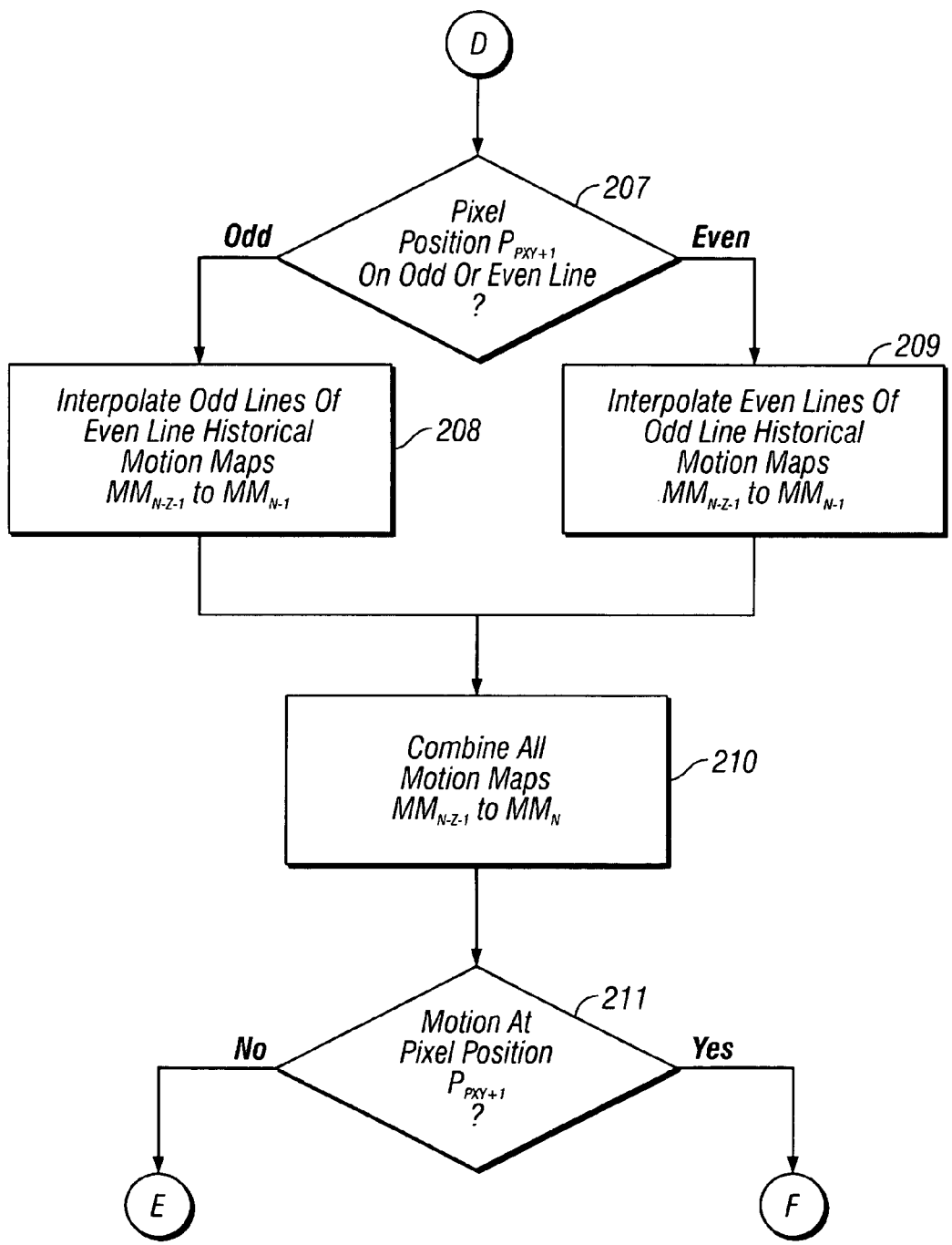
Figure 2:
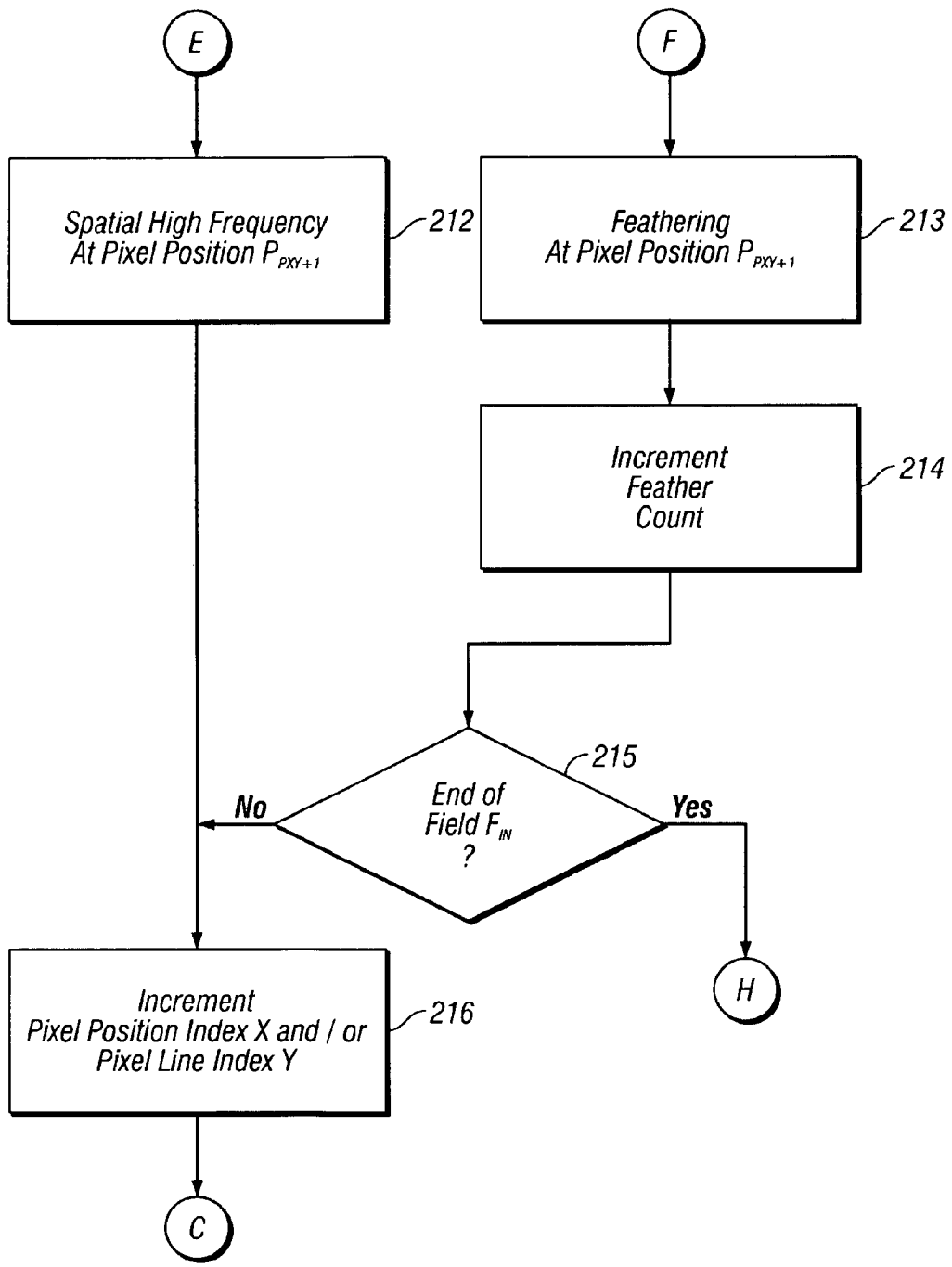
Figure 2:
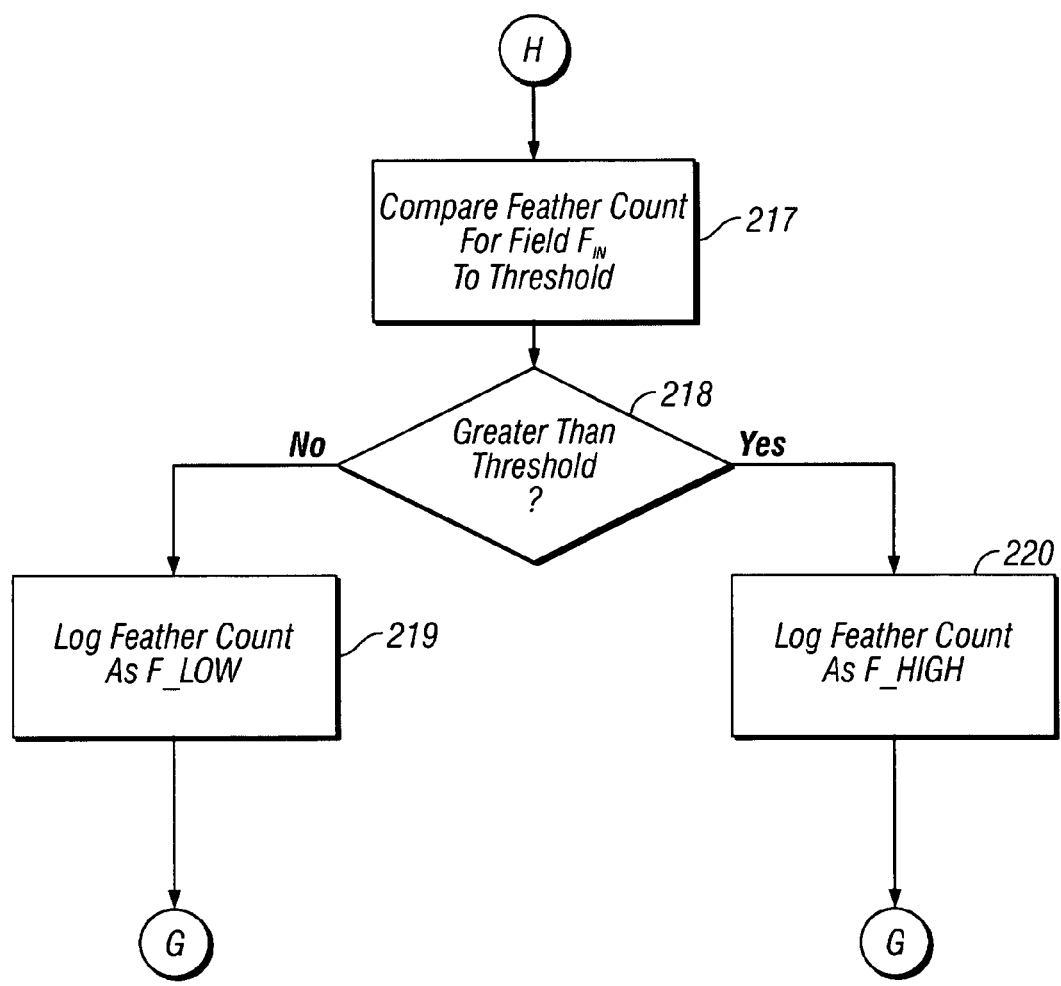
Figure 2:
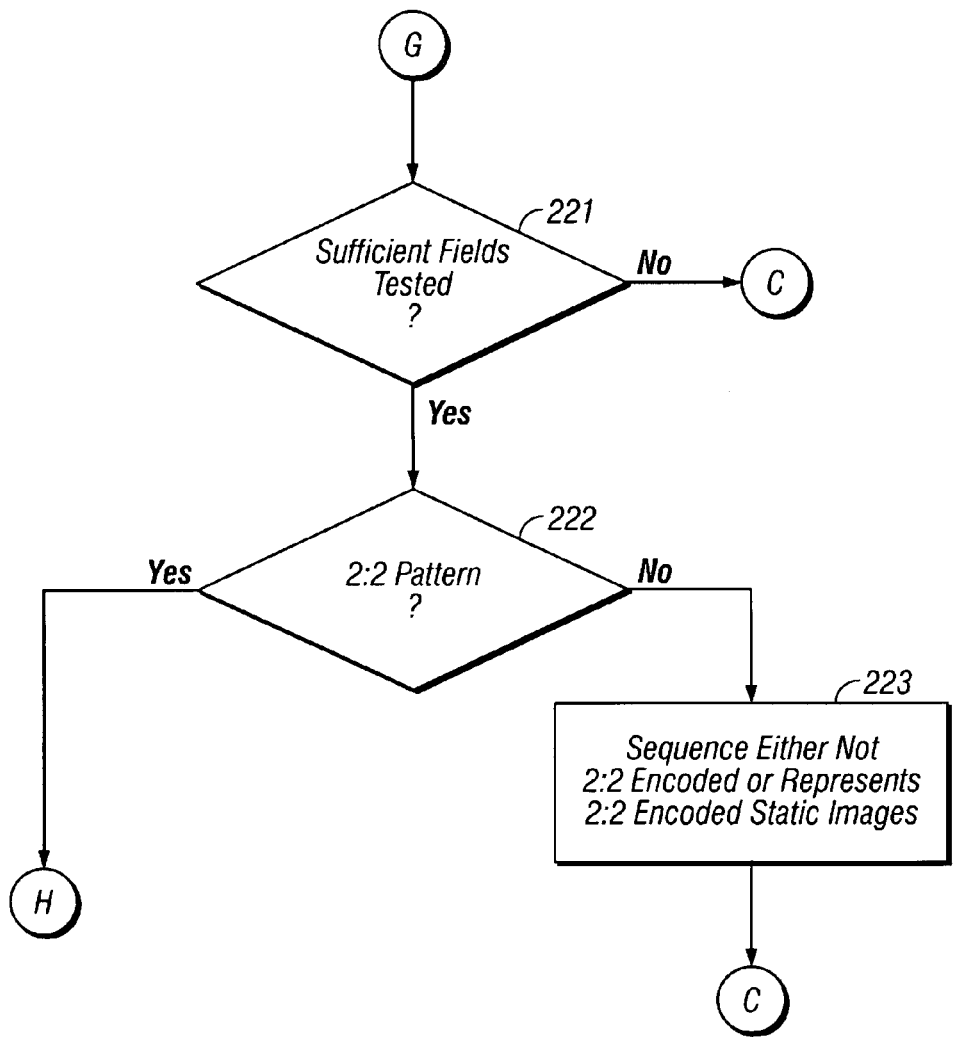
Figure 2:
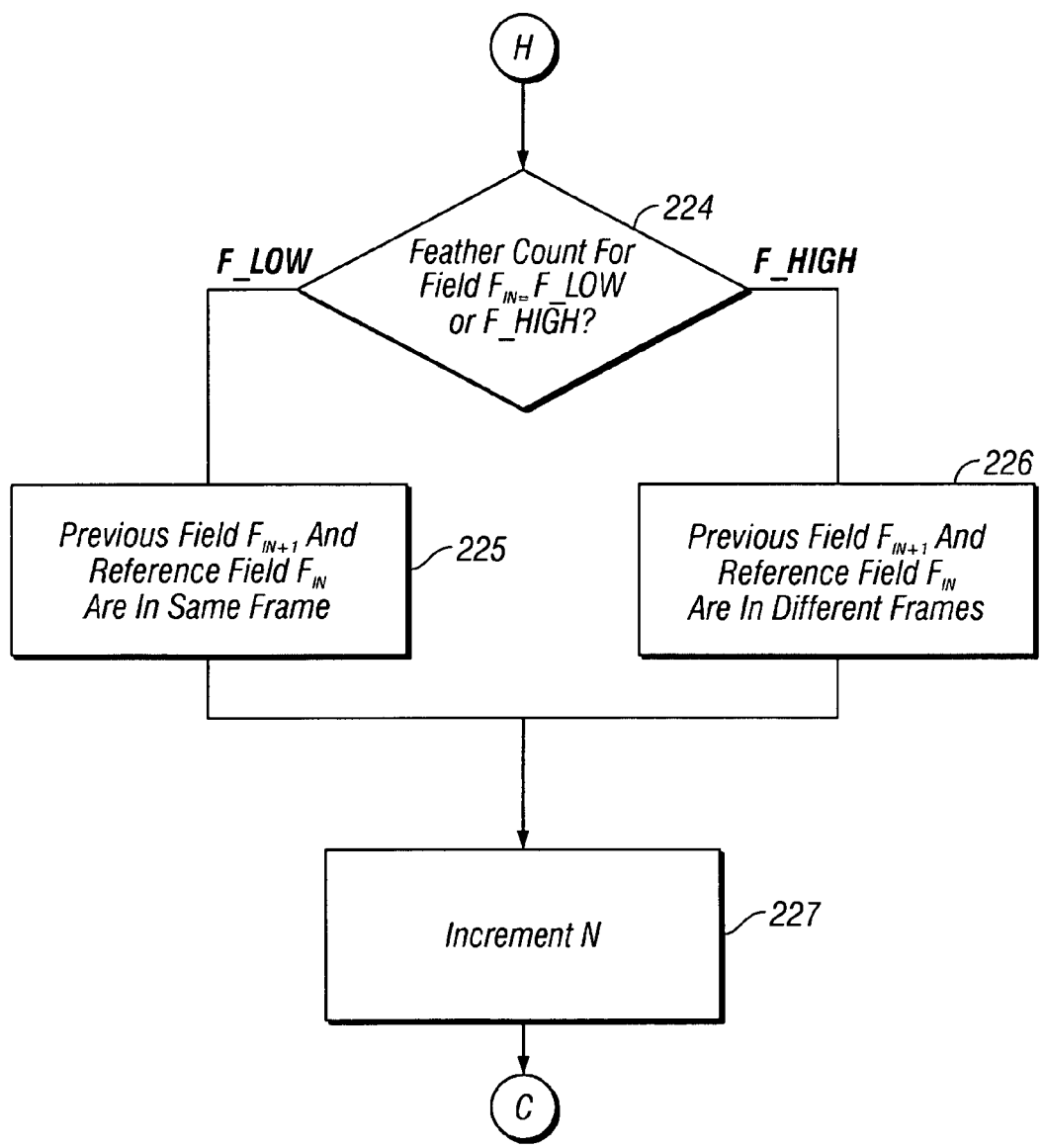

The principles of the present invention and their advantages are best understood by referring to the illustrated embodiment depicted in FIGS. 1-3 of the drawings, in which like numbers designate like parts.

FIG. 1 is a diagram of an exemplary analog to digital video encoder 100 suitable for describing the principles of the present invention. In the illustrated embodiment, video encoder 100 converts a composite analog video input signal, in the YC format, into digital video data in the digital YCrCb component video format, although the inventive principles are not necessarily limited thereto.

In video encoder 100, the composite analog input video is converted into composite digital video in the YC format by analog to digital converters (ADCs) 101. The digitized YC video data are then passed through automatic gain control (AGC) and filter block 102. A sync detector 103 detects the vertical synchronization (VSYNC) signal, which controls the timing of the playback of each display field, and the horizontal synchronization signal (HSYNC), which controls the timing the playback of each display line.

Y/C separator block 104 next separates the digital Y and C components of the digitized composite video data stream. The C component is demodulated into U and V color components by color subcarrier recovery block 105 and chroma demodulation block 106, described in further detail below. The Y, U, and V components are passed directly to video processor 107 for further processing to generate the Y, Cr and Cb components of the output YCrCb digital component video signal.

In the illustrated embodiment of audio-visual recording and playback system, deinterlacing circuitry within video processor 107 performs interlaced video to progressive scan video conversion (deinterlacing). Additionally, video processor 107 performs 2:2 stream detection and allocates 2:2 generated interlaced fields into the proper interlaced or deinterlaced display frames as discussed further below. In alternate embodiments, a dedicated post-processor or similar subsystem performs deinterlacing and 2:2 detection if the input stream is already digitized.

FIG. 2 is a flow chart illustrating a representative method 200 for detecting a stream of interlaced fields of video data originally generated with the 2:2 technique and subsequently allocating those 2:2 generated fields into the proper frames. For discussion purposes, FIGS. 3A and 3B are respectively conceptual diagrams of small sections of interlaced and progressive scan displays.

Figure 3A:
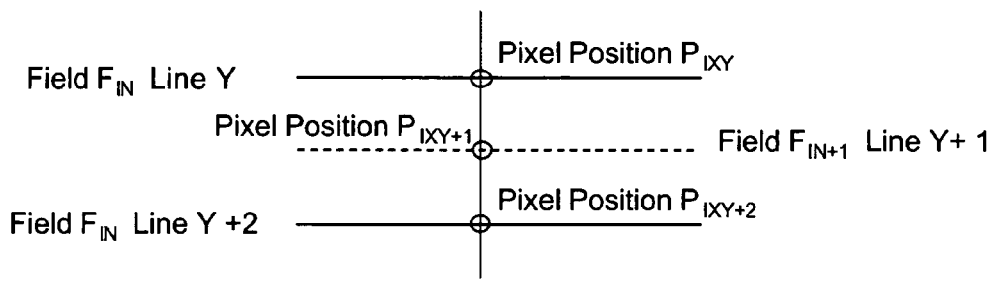
FIGS. 3A and 3B are conceptual diagrams of respective small sections of deinterlaced and progressive scan displays suitable for describing the exemplary nomenclature utilized in the flow chart of FIG. 2.
Figure 3B:
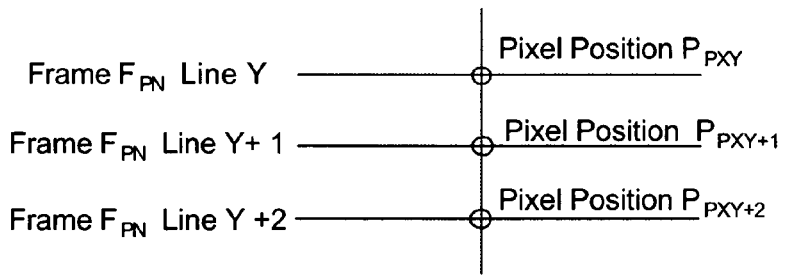

In the example shown in FIGS. 2, and 3A-3B, the current interlaced field is field $F_{IN}$, in which N is an integer and may be odd or even. As shown in FIG. 3A, the current line of current field $F_{IN}$ is line Y, wherein Y is also an integer, and the spatially following line of current field $F_{IN}$ is line Y+2. The temporally following interlaced field is field $F_{IN+1}$ and provides vertically adjacent line Y+1 when fields $F_{IN}$ and $F_{IN+1}$ are interlaced in a typical interlaced display system. Representative vertically aligned interlaced display pixels positions are display pixel positions $P_{IXY}$ and $P_{IXY+2}$ of the current field and pixel position $P_{IXY+1}$ of the temporally following field $F_{IN+1}$, in which X is an integer representing the corresponding pixel position along lines Y, Y+1, and Y+2. Display pixel positions $P_{IXY}$ and $P_{IXY+2}$ of the current field and pixel position $P_{IXY+1}$ are represented by corresponding pixel values $P_{IXY}$, $P_{IXY+2}$ and $P_{IXY+1}$, including, for example luminance and chrominance values.

As shown in FIG. 3B, each progressive scan frame is designated $F_{PN}$, in which N is an integer. In the progressive scan frame $F_{PN}$, representative vertically adjacent pixels positions of three lines Y, Y+1, and Y+2, are designated $P_{PXY}$ and $P_{PXY+1}$, and $P_{PXY+2}$. Pixel positions $P_{PXY}$ and $P_{PXY+1}$, and $P_{PXY+2}$ are represented by corresponding pixel values $P_{PXY}$ and $P_{PXY+1}$, and $P_{PXY+2}$, including, for example, luminance and chrominance values.

For discussion purposes, procedure 200 will be described by assuming current interlaced field $F_{IN}$ is the reference field such that pixel lines Y and Y+2 of interlaced field $F_{IN}$ provide lines Y and Y+2 of progressive scan frame $F_{PN}$. In this example, line Y+1, of progressive scan frame $F_{PN}$, and in particular pixel value $P_{PXY+1}$ corresponding to pixel position $P_{PXY+1}$, is being tested during the current iteration of procedure 200.

Procedure 200 begins at block 201, and at block 201a, the reference interlaced field is set as $F_{IN}$, the previous interlaced field becomes field $F_{IN-1}$, and the next interlaced field becomes field $F_{IN+1}$. Thus, for example if reference interlaced field $F_{IN}$ has even parity (i.e. is composed even numbered pixel lines), then preceding interlaced field $F_{IN-1}$ and following interlaced field $F_{IN+1}$ both have odd parity (i.e. are composed of odd numbered pixel lines). On the other hand, if reference field $F_{IN}$ has odd parity, then preceding field $F_{IN-1}$ and following field $F_{IN+1}$ are both of even parity.

A motion map $MM_N$ is generated at block 202 by comparing at least one of the chrominance and luminance data of each pixel value of each pixel position of preceding field $F_{IN-1}$ with the luminance and chrominance data of the corresponding pixel value of each pixel position of following field $F_{IN+1}$. Motion map $MM_N$ is preferably a one (1) bit per pixel map, with each bit mapping to a given pixel position set to a logic one (1) to indicate a change in corresponding pixel value, having a magnitude greater than a selected threshold, between fields $F_{IN-1}$ and $F_{IN+1}$ (i.e. motion detected). On the other hand, if no change, having a magnitude greater than the selected threshold, in either luminance or chrominance, is detected for the given pixel value between fields $F_{IN-1}$ and $F_{IN+1}$, then the motion map bit for the corresponding pixel position is set to a logic zero (0) (i.e. no motion).

As discussed further below, motion maps generated at block 202 have lines of motion mapping bits of either an odd or even parity, depending on the parity of the lines of preceding field $F_{IN-1}$ and following field $F_{IN+1}$ being compared by parity check. In particular, if interlaced fields $F_{IN-1}$ are $F_{IN+1}$ are odd, the lines of motion mapping of motion map $MM_N$ represent odd pixel lines, and if the lines of interlaced fields $F_{IN-1}$ are $F_{IN+1}$ are even, the lines of motion mapping bits of motion map $MM_N$ represent even pixel lines.

At block 203, pixel value $P_{PXY+1}$ corresponding to pixel position $P_{PXY+1}$ of following field $F_{IN+1}$ is weaved with pixel values $P_{PXY}$ and $P_{PXY+2}$ corresponding to pixel positions $P_{PXY}$ and $P_{PXY+2}$ of reference field $F_{IN}$. After weaving is performed at block 203, a check is made at block 204 for feathering at pixel position $P_{PXY+1}$. Feathering is checked by comparing the characteristics of pixel value $P_{PXY+1}$ with the characteristics of pixel values $P_{PXY}$ and $P_{PXY+2}$ after weaving. Specifically, the luminance and chrominance data of pixel value $P_{PXY+1}$ are compared against the luminance and chrominance data of pixel values $P_{PXY}$ and $P_{PXY+2}$, as well as a threshold value. A check for feathering is required because the single motion map parity check at block 203 can miss motion which occurs during the time between the generation of preceding field $F_{IN-1}$ and following field $F_{IN+1}$. On the other hand, feathering could also be a representation of vertical spatial high frequency. Advantageously, the principles of the present invention allows for an accurate determination if any detected feathering represents actual motion, due to field splitting of the original progressive frame, or vertical spatial high frequency.

At decision block 205, feathering is detected when the magnitude of any change, in at least one of the luminance or chrominance values, between pixel value $P_{PXY+1}$ and both pixel values $P_{PXY}$ and $P_{PXY+2}$ exceeds a selected threshold, and the direction of change between pixel values $P_{PXY}$ and pixel $P_{PXY+1}$ and the direction of change between pixel values $P_{PXY+1}$ and $P_{PXY+2}$ is the same. Otherwise, if any of these three conditions is not met, an absence of feathering is detected at pixel position $P_{PXY+1}$.

If no feathering is detected at pixel position $P_{PXY+1}$, then at block 206, the pixel index X and/or the line index Y is incremented and procedure 200 returns to block 203 for the testing of the next pixel in current (reference) field $F_{IN}$.

In contrast, if feathering is detected at pixel position $P_{PXY+1}$ at decision block 205, then historical motion detection must be performed to determine if the feathering is the result of actual motion or the result of vertical spatial high frequency. Vertical spatial high frequency occurs when pixel values rapidly change between vertical pixel positions because of sharp spatial changes in the display objects being generated, such as at the boundaries checker-board patterns or with fine resolution pixel patterns, for example fine vertical display object lines.

To detect historical motion at pixel position $P_{PXY+1}$, motion maps $MM_{N-Z}$ to $MM_N$, including current motion map $MM_N$ generated at block 202 and the motion maps generated during the testing of Z–1 number of previous fields $F_{IN-Z}$ to $F_{IN-1}$, are combined into single motion map. Specifically, a determination is made at decision block 207 as to the parity of the line containing current pixel position $P_{PXY+1}$. If pixel position $P_{PXY+1}$ has odd parity (i.e. is part of an odd line Y+1), then the odd map lines of even-line motion maps $MM_{N-Z}$ to $MM_{N-1}$ are generated by interpolation of the existing even motion map lines at block 208. If pixel $P_{PXY+1}$ has even parity (i.e. is part of an even line Y+1), then the even map lines of odd-line motion maps $MM_{N-Z}$ to $MM_{N-1}$ are generated by interpolation of the existing odd motion map lines at block 209.

The interpolation operations performed at blocks 208 and 209 ensure that all Z+1 number of motion maps $MM_{N-Z}$ to $MM_N$ have map lines of the same parity as the line including pixel position $P_{PXY+1}$ and therefore can be appropriately combined at block 210, such that a detection of historical motion over Z+1 number of interlaced fields can be made. Combination of memory maps $MM_{N-Z-1}$ to $MM_N$, is preferably accomplished by performing a logical-OR operation on a mapping-bit by mapping-bit basis. Consequently, at decision block 211, a determination can be made as to whether, over a history of the generation of Z+1 number of fields $F_{IN-Z}$ to $F_{IN}$, motion has occurred at pixel position $P_{PXY+1}$.

If historical motion has not occurred at decision block 211, then at block 212, pixel value $P_{PXY+1}$ corresponding to pixel position $P_{PXY+1}$ is considered static with feathering (i.e. represents vertical spatial high frequency). In this case, at block 216, the pixel index X and/or the line index Y is incremented, and procedure 200 loops-back to block 203 to test the next pixel position in reference field $F_{IN}$.

If instead motion is detected at decision block 211, then at block 213, pixel $P_{PXY+1}$ value corresponding to pixel position $P_{PXY+1}$ is considered as a feathered pixel with motion due to feathering and a feathered pixel count increments at block 214. Procedure 200 then loops, at decision block 215 and index incrementation block 216, until all the pixel positions in reference field $F_{IN}$ have been tested.

Once all the pixel positions in reference field $F_{IN}$ have been tested at block 215, the number of feathered pixels is compared against a threshold at block 217. If at decision block 218 the feathered pixel count for field $F_{IN}$ is below the threshold, then at block 219, the feathered pixel count for reference field $F_{IN}$ is logged as being low (i.e. F_LOW). While F_LOW ideally is zero (0), in actual implementations, this count will normally be a small positive number. Otherwise, if the feathered pixel count is above the threshold, at block 218, then the feathered pixel count is logged as high (i.e. F_HIGH) at block 220.

After observing a sufficiently long sequence of fields at decision block 221, a determination is made at decision block 222 as to whether the current sequence of fields were generated using 2:2 pull-down. Ideally, since each original frame of film is converted into a pair of odd and even fields with the same information content, a pattern of feathered pixel counts logged at blocks 219 and 220 with each iteration of procedure 200 should be:

F_LOW, F_HIGH, F_LOW, F_HIGH, F_LOW . . . .

If this pattern is not detected at decision block 222, then, at block 223, the current sequence of fields either was not generated with 2:2 pull-down or was generated with 2:2 pull-down but represents static images. In this case, adaptive deinterlacing is utilized to generate progressive scan frames. For 2:2 pull-down data of static images, the adaptive deinterlacing essentially becomes into a simple weave. Advantageously, if the data represent 2:2 static images, vertical spatial high frequency pixels are preserved. Procedure 200 repeatedly returns from block 223 to block 203 and continues to monitor the video stream for possible detection of 2:2 pull-down generated data with motion.

On the other hand, if 2:2 pull-down frames are detected at decision block 222, then the principles of the present invention allow for the allocating of the interlaced fields into the proper frames. Specifically, at block 224 a check is made to determine if the feathered pixel count for reference field $F_{IN}$ has the value F_LOW or F_HIGH. If the number of feathered pixels is F_LOW, reference field $F_{IN}$ and following field $F_{IN+1}$ belong in the same output frame. Otherwise, it the feathered pixels count is F_HIGH, then reference field $F_{IN}$ and following field $F_{IN+1}$ belong in different progressive scan frames. A typical progressive scan output generated from 2:2 pull-down generated interlaced fields follows the sequence:

Frame $F_{P0}$=Field $F_{I0}$ weaved with Field $F_{I1}$
Frame $F_{P1}$=Field $F_{I0}$ weaved with Field $F_{I1}$
Frame $F_{P2}$=Field $F_{I2}$ weaved with Field $F_{I3}$
Frame $F_{P0}$=Field $F_{I2}$ weaved with Field $F_{I3}$ Advantageously, the principles of the present detection provide for accurate 2:2 detection, and subsequent identification of field pairs, even in view of interlaced fields with spatial high frequency.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of detecting a stream of video data generated utilizing a pull-down technique comprising:
   receiving a sequence of fields of interlaced video data;
   for each pair of a plurality of pairs of the fields of interlaced video in the sequence:
      weaving pixel values corresponding to pixel positions of pixel lines of a first parity of a first field of the pair of fields with pixel values corresponding to pixel positions of pixel lines of a second parity of a second field of the pair of fields;
      for each pixel value corresponding to each pixel position of each pixel line of the second field of the pair of fields after weaving, checking for feathering at the corresponding pixel position due to motion; and
      counting the pixel positions with feathering due to motion in the second field of the pair of fields; and
   for the plurality of pairs of fields in the sequence, checking for a pattern in the number of counted pixel positions with feathering due to motion in the second field of each pair of fields to determine if the video data comprises data generated utilizing a pull-down technique.

2. The method of claim 1, wherein the pull-down comprises 2:2 pull-down.

3. The method of claim 1, wherein checking for a pattern comprises checking for a pattern including a pair of fields with a number of pixel positions with feathering due to motion in the second field of the pair above a threshold number alternating with a pair of fields with a number of pixel positions with feathering due to motion in the second field below the threshold number.

4. The method of claim 1, wherein checking for pixel positions with feathering due to motion in the second field after weaving comprises:
   checking for a change in a characteristic between the pixel value corresponding to each pixel position of the second field and the pixel values corresponding to neighboring pixels in the first field to detect pixel positions in the second field with feathering; and
   for each pixel position in the second field with feathering, determining whether the feathering is due to motion including:
   generating a motion map for a current pair of fields and a selected number of pairs of preceding fields in the sequence of fields;
   combining the motion maps generated; and
   for each pixel position with detected feathering, checking a corresponding mapping bit in the combined motion map to determine whether the feathering is due to motion.

5. The method of claim 4, wherein the characteristic is selected from the group consisting of luminance and chrominance.

6. The method of claim 5, wherein generating a motion map for the current pair of fields comprises generating a motion map by comparing pixel values corresponding to pixel positions of the lines of the second parity of the second field of the pair of fields with pixel values corresponding to pixel positions of pixel lines of the second parity of a field preceding the pair of fields in the sequence of fields.

7. The method of claim 6, wherein generating the motion maps for the selected number of pairs of preceding fields in the sequence comprises:
   generating a set of motion maps including bits representing motion or an absence of motion between pixel positions of fields having lines of the first parity; and
   generating another set of motion maps including bits representing motion or an absence of motion between pixel positions of fields having lines of the first parity.

8. The method of claim 7, further comprising:
   for each pair of the preceding interlaced fields having pixel lines of the first parity:
      generating a motion map including bits representing motion or an absence of motion at pixel positions of the lines of the first parity by comparing the pixel values corresponding to the pixel positions of the lines of the first parity; and
      interpolating between the bits representing the pixel positions of the pixel lines of the first parity to generate bits in the motion map representing pixels positions of pixel lines of the second parity.

9. The method of claim 4, further comprising selecting each pair of fields with the number of pixel positions due to motion below the threshold number for generating a corresponding frame of progressive scan video.

10. The method of claim 1, wherein the first field of the pair temporally precedes the second field of the pair.

11. A video processor for detecting a stream of interlaced fields of video data generated by pull-down and operable to:
   for each pair of a plurality of pairs of received fields of interlaced video data:
      weave pixel values corresponding to pixel positions of a field of the pair of fields having pixel lines of a first parity with pixel values corresponding to pixel positions of another field of the pair having lines of a second parity to generate a weaved pair of fields including a field and another field;
      check for pixel positions having feathering due to motion in the another field in the weaved pair of fields; and
      count a number of pixel positions having feathering due to motion in the another field of the weaved pair of fields; and
   for the plurality of pairs of fields in the sequence, checking for a pattern in the number of pixels pixel positions counted in the another field of each pair of weaved fields to determine if the video data comprises data generated utilizing pull-down.

12. The video processor of claim 11 wherein the pull-down comprises 2:2 pull-down.

13. The video processor of claim 12, further operable in response to determining that the video data comprises data generated utilizing 2:2 pull-down, checking the pattern to allocate pairs of interlaced fields to a corresponding progressive scan frame.

14. The video processor of claim 11, wherein the video processor checks for a pattern including a pair of fields with a number of pixel positions with feathering due to motion in the another field of the pair above a threshold number alternating with a pair of fields with a number of pixel positions with feathering due to motion in the second field below the threshold number.

15. The video processor of claim 11, wherein the video processor is operable to check for pixel positions having feathering due to motion by:
- checking for a change in a selected characteristic of the pixel value corresponding to a selected pixel position in the another field of the weaved pair of fields and the pixel values corresponding to neighboring pixel positions in the field of the weaved pair of fields; and
- in response to detecting a change of a selected magnitude in the selected characteristic, checking for historical motion at the selected pixel position for a selected plurality of fields in the stream of fields of interlaced video data.

16. The video processor of claim 15, wherein the video processor is operable to check for historical motion by:
- generating a plurality of motion maps including bits representing motion or an absence of motion of pixel positions of the lines of the second parity for the selected plurality of fields;
- combining the plurality of motion maps to generate a combined motion map; and
- checking a corresponding bit in the combined motion map to check for historical motion at the selected pixel position.

17. The video processor of claim 16, wherein the video processor is operable to generate a plurality of motion maps by:
- for pairs of the plurality of fields having pixel lines of the first parity:
- generating a motion map including bits representing motion or an absence of motion at pixel positions of the lines of the first parity by comparing corresponding pixel values of the pixel positions of corresponding lines of the first parity; and
- interpolating between the bits representing pixel positions of the pixel lines of the second parity to generate bits representing pixel positions of pixel lines of the first parity.

18. The video processor of claim 11, wherein the video processor is operable to perform adaptive deinterlacing on a sequence of fields of the stream of interlaced fields of video data without a pattern corresponding to data generated utilizing pull-down.

19. A method for detecting a stream of interlaced fields of video data generated by 2:2 pull-down comprising:
- for each pair of temporally adjacent fields of a stream of fields of interlaced video data, one field of each pair having lines of a first parity and another field having lines of a second parity, performing:
  - weaving pixel values corresponding to pixel positions of the pair of fields together to generate a frame having lines of the first and second parities;
  - checking for pixel positions with feathering due to motion in the lines of the second parity of the frame;
  - counting a number of pixel positions with feathering due to motion in the lines of the second parity of the frame; and
- for plurality of temporally adjacent pairs of fields, checking for a pattern of frames with a higher number of pixel positions with feathering due to motion alternating with frames with a lower number of pixel positions with feathering due to motion to detect video data generated by 2:2 pull-down.

20. The method of claim 19, further comprising selecting frames with the lower number of pixel positions with feathering due to motion for generating a stream of progressive scan video frames.

21. The method of claim 19, wherein checking for the pattern is implemented in a video processor.

22. The method of claim 19, further comprising performing adaptive deinterlacing on a sequence of fields in the stream of interlaced fields of video data without a pattern corresponding to data generated utilizing 2:2 pull-down.

* * * * *